May 21, 1940.  A. A. LADON ET AL  2,201,341
MOLDING SUPPORT MEANS
Filed May 2, 1938  2 Sheets-Sheet 1
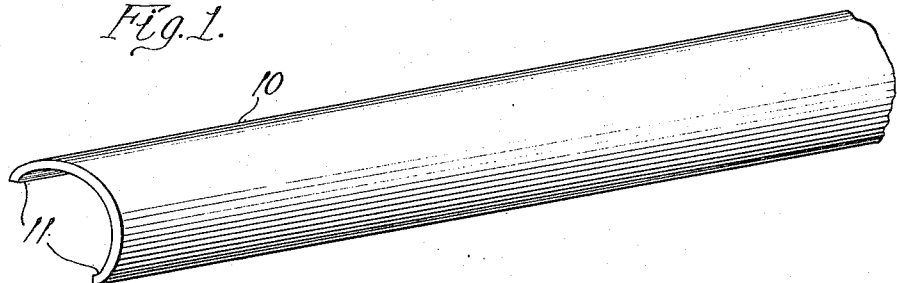
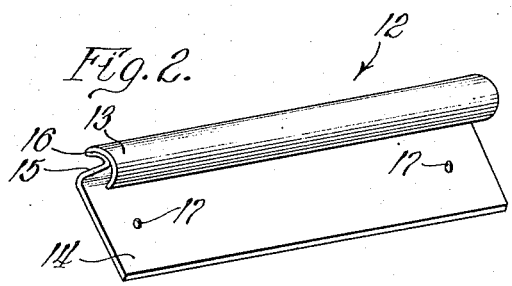
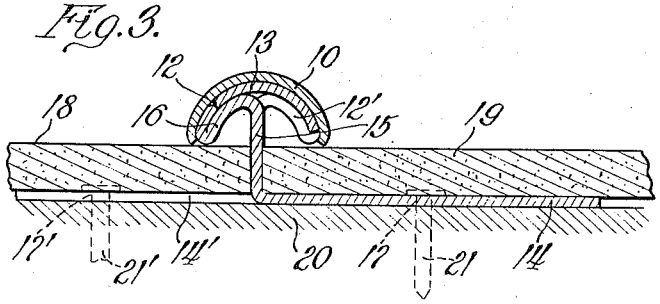
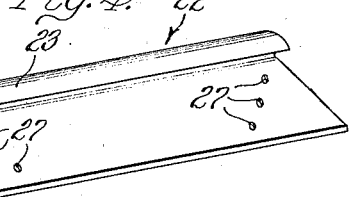
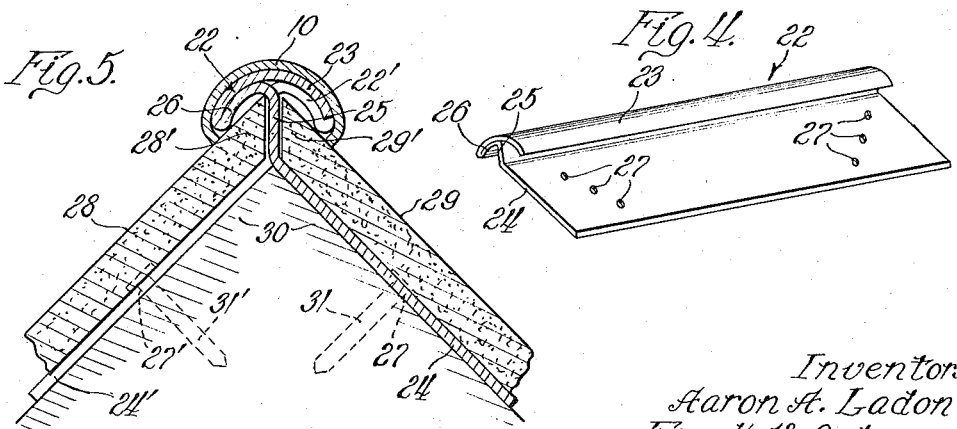
Inventors
Aaron A. Ladon
Frank V. Osborn
By Brown, Jackson, Boettcher & Dienner
Attys.

May 21, 1940.  A. A. LADON ET AL  2,201,341
MOLDING SUPPORT MEANS
Filed May 2, 1938   2 Sheets-Sheet 2

Inventors
Aaron A. Ladon
Frank O. Osborn
By Brown, Jackson, Boettcher & Dienner
Attys.

Patented May 21, 1940

2,201,341

UNITED STATES PATENT OFFICE 2,201,341

MOLDING SUPPORT MEANS

Aaron A. Ladon, Evanston, Ill., and Frank V. Osborn, Muncie, Ind., assignors to Masonite Corporation, Chicago, Ill., a corporation of Delaware Application May 2, 1938, Serial No. 205,402

9 Claims. (Cl. 72—121)

This invention relates, generally, to means for receiving mold members and it has particular relation to clips for receiving snap on metal molding strips employing a single general configuration which permits reversible mounting at various angular positions.

The object of the invention, generally stated, is to provide a clip for receiving snap on metal molding strips which shall be simple and efficient in operation and which may be readily and economically manufactured and installed.

An object of the invention is to provide for mounting mold members along the juxtaposed edges of a pair of platelike members, regardless of whether they are in the same plane or are angularly disposed relative to each other.

Another object of the invention is to provide for mounting snap on mold members along the juxtaposed edges of wallboards, regardless of whether they are in the same plane or form inside or outside corners.

Still another object of the invention is to provide for the reverse mounting of clips for receiving snap on metal molding without changing the effective molding receiving portions of the clips.

A further object of the invention is to provide a single general shape for clips for receiving snap on metal molding, regardless of whether the clips are mounted on a wall or at the inside or outside corner of the wall or are oppositely positioned on the wall.

Other objects of the invention will, in part, be obvious and in part appear hereinafter.

The invention, accordingly, is disclosed in the embodiments hereof shown in the accompanying drawings, and it comprises the features of construction, combination of elements and arrangement of parts which will be exemplified in the constructions hereinafter set forth, and the scope of the application of which will be indicated in the appended claims.

For a more complete understanding of the nature and scope of the invention, reference may be had to the following detailed description, taken in connection with the accompanying drawings, in which—

Figure 1 is a perspective view of a portion of a length of metal molding that is adapted to be snapped onto support means;

Figure 2 is a perspective view of a clip for mounting metal molding on a wall at the junction of a pair of wallboards positioned in the same plane;

Figure 3 is a sectional view showing how the clip illustrated in Figure 2 is used for supporting snap on metal molding along the juxtaposed edges of a pair of wallboards positioned in the same plane;

Figure 4 is a perspective view of a clip for receiving snap on metal molding along the juxtaposed edges of a pair of wallboards positioned at an outside corner of a wall;

Figure 5 is a sectional view showing how the clip illustrated in Figure 4 is used for supporting metal molding along the juxtaposed edges of a pair of wallboards at an outside corner;

Figure 6:
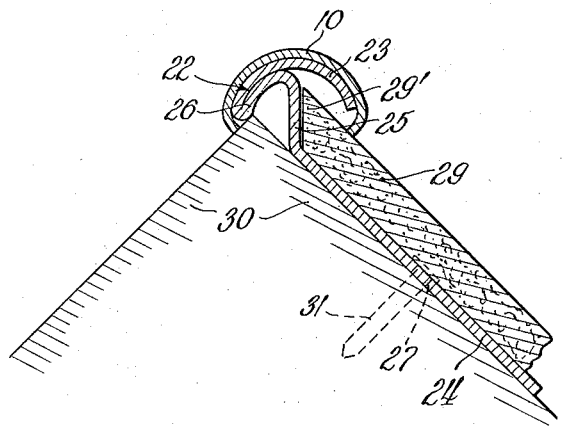
Figure 6 is a sectional view showing how the clip illustrated in Figure 4 is used for supporting metal molding along the edge of a single wallboard.

Referring now particularly to Figure 1 of the drawings, it will be observed that the reference character 10 designates a mold member. Preferably, the mold member 10 is formed of metal, such as stainless steel, has an arcuate cross section and inturned edges 11 to permit snapping into place. The mold member 10 is employed for a trim for panels mounted on the walls of a room, although its use is by no means limited to this particular purpose.

With a view to mounting the mold member 10 along the juxtaposed edges of a pair of panels or wallboards positioned in the same plane, the clip shown generally at 12 in Figure 2 may be employed. As illustrated, the clip 12 is of one-piece construction and has an arcuate head portion 13 onto which the mold member 10 may be snapped. The clip 12 is provided with a flat leg portion 14 for positioning underneath one of the panels or wallboards. A connecting portion 15, forming a continuation of the leg portion 14, serves to interconnect the latter with the head portion 13. The connecting portion 15 includes a portion 16 forming a continuation of one edge of the head portion 13 and, as illustrated, conforming to the inner curvature of the head portion 13 for substantially half its width. The leg portion 14 may be provided with suitable apertures 17 through which nails or screws may be positioned for mounting the clip 12 in place.

In Figure 3 the manner in which the mold member 10 may be mounted between a pair of juxtaposed panels or wallboards 18 and 19 by one or more of the clips 12 is illustrated. As there shown, the panels or wallboards 18 and 19 are mounted in the same plane on a wall 20. One clip 12 has its leg portion 14 extending underneath the panel or wallboard 19 and secured to the wall 20 by one or more nails 21. Another clip 12' has its leg portion 14' extending underneath the panel or wallboard 18 and secured to the wall 20 by nails 21' extending through suitable apertures 17'.

As indicated, the head portion 13 of the clip 12 is arcuate in shape so that externally it presents a convex surface for receiving the mold member 10. Its under surface is concave. In order to make the effective position of the head portion 13 the same regardless of the direction in which the leg portion 14 extends, the connecting portion 15 is located substantially normal to and centrally of the chord extending between the edges of the concave inner surface of the head portion 13. Since the leg portion 14 is positioned at an angle of 90° away from the connecting portion 15, the clip 12 can be reversed in position, as illustrated in Figure 3 at 12', without changing the effective position of the head portion 13 for receiving the mold member 10.

In Figure 4 the clip shown generally at 22 is intended for mounting snap on metal molding, for example the mold member 10, along the juxtaposed edges of a pair of panels or wallboards positioned at an outside corner. The construction of the clip 22 is generally similar to the construction of the clip 12 shown in Figure 2. The clip 22 comprises a head portion 23 onto which the mold member 10 may be snapped. A leg portion 24 is provided for positioning underneath the panels or wallboards to secure the clip 22 in place. A connecting portion 25 forms a continuation of the leg portion 24 and through the portion 26 forms a connection to one edge of the head portion 23. Suitable apertures 27 are provided in the leg portion 24 for receiving nails or screws.

The manner in which the clip 22 is employed for supporting the mold member 10 along the juxtaposed edges of a pair of panels or wallboards 28 and 29 located at the outside corner of a wall 30 is illustrated more clearly in Figure 5. As there shown, the leg member 24 is inclined away from the connecting portion 25 at an angle of about 135°. Since the connecting portion 25, like the connecting portion 15 of the clip 12, Figure 2, is positioned substantially normal to and centrally of the chord joining the edges of the concave inner surface of the head portion 13, the clip 22 may be mounted in reversed position, as indicated at 22', without in any way altering the effective position of the head portion 23 for receiving the mold member 10. As indicated, the leg portion 24 of the clip 22 is positioned underneath the panel or wallboard 29 and is secured in position by nails 31 extending through the apertures 27. Likewise the leg portion 24' of the clip 22' is located underneath the panel or wallboard 28 and is secured in position by nails 31' extending through suitable apertures 27'. As shown, the juxtaposed edges 28' and 29' of the panels or wallboards 28 and 29, respectively, may be beveled slightly in order to permit them to more readily interfit underneath the head portions of the clips 22 and 22' and underneath the mold member 10.

While the clip 22 has been shown in Figure 5 for use in supporting a mold member 10 along the juxtaposed edges of panels or wallboards 28 and 29 located at an outside corner of the wall 30, it will be obvious that the panel or wallboard 28 may be omitted, with the result that the mold member 10 forms an edging for the panel or wallboard 29, as shown more clearly in Figure 6. In such case the clip 22 would be moved slightly away from the extreme corner of the wall 30 so as to permit the left hand edge of the mold member 10 to overlap slightly, as illustrated.

Alternatively, the clip 22 can be employed for supporting the mold member 10 as an edging for the panel or wallboard 29 located on a plane surface, for example the wall 20, Figure 3. Since the leg portion 24 is bent away from the connecting portion 25 on the side opposite the portion 26, a balanced design results. Because of the overlapping of the portion 26 with the head portion 23 a maximum of rigidity is provided along the edge of the head portion 23 that has the lesser support. Moreover, the rounded surface of the contiguous head portion 23 and the portion 26 prevents digging or otherwise scratching the adjacent wall surface.

Figure 7:
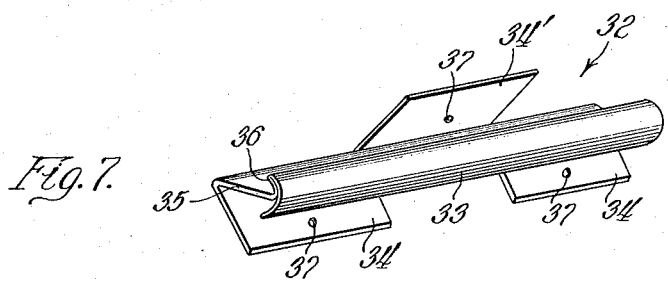
Figure 7 is a perspective view of a clip for receiving snap on metal molding along the juxtaposed edges of a pair of wallboards positioned at the inside corner of a wall, parts of the leg portion being turned oppositely for interfitting underneath both wallboards.

In Figure 7 of the drawings the clip shown generally at 32 may be employed for mounting the mold member 10 along the juxtaposed edges of a pair of panels or wallboards positioned at the inside corner of a wall. The construction of the clip 32 is generally similar to the constructions of the clips 12 and 22, shown in Figures 2 and 4, respectively. The clip 32 is provided with an arcuate head portion 33 onto which the mold member 10 may be snapped. Leg portions 34 and 34' are provided for mounting the clip 32 in position on the inside corner of a wall. It will be observed that the leg portion 34' is turned in a direction opposite to the direction in which the leg portions 34 are turned. This construction is optional, since a continuous leg portion may be employed, as shown at 14 and 24 in Figures 2 and 4, respectively. The leg portions 34 and 34' continue into the connecting portion 35 terminating in portion 36 which forms a continuation of one edge of the head portion 33. Suitable apertures 37 may be provided in the leg portions 34 and 34' for receiving nails or screws.

Figure 8:
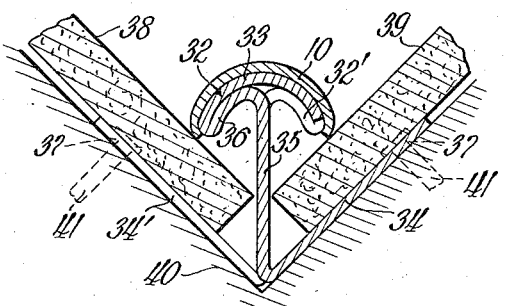
Figure 8 is a sectional view showing how the clip illustrated in Figure 7 may be employed for supporting metal molding along the juxtaposed edges of a pair of wallboards positioned at an inside corner.

In Figure 8 of the drawings the manner in which the mold member 10 may be mounted along the juxtaposed edges of panels or wallboards 38 and 39 mounted along the inside corner of a wall 40 is illustrated. It will be observed that the leg portions 34 and 34' are inclined away from the connecting portion 35 at an angle of about 45°. It will also be noted that the connecting portion 35 is positioned normal to and centrally of the chord between the edges of the concave inner surface of the head portion 33. This construction permits the reverse positioning of the clip 32 without in any way affecting the effective position of the head portion 33 for receiving the mold member 10. In Figure 8 a portion of the next reversely positioned clip 32' is shown.

Figure 9:
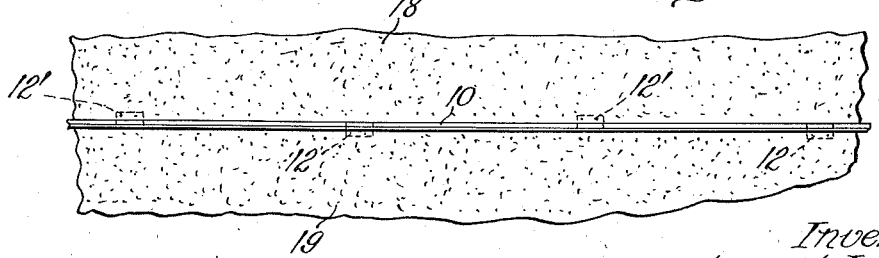
Figure 9 is a plan view illustrating the general locations of the clips shown in Figures 2 and 3 for mounting a metal molding member.

In Figure 9 of the drawings the alternate arrangement of the clips 12 and 12' for supporting the mold member 10 along the juxtaposed edges of the panels or wallboards 18 and 19 is illustrated. It will be obvious that all of the clips 12 and 12' may be positioned in the same relative location if so desired. For maximum rigidity, however, the alternate positioning is preferred.

Before the clips are mounted on the wall they are snapped into the mold member 10 with the leg portions extending in alternate directions. They are then spaced apart at suitable distances, as indicated in Figure 9, and are then nailed or screwed into place. By first assembling the clips into the mold member 10, exact alignment thereof is assured. However, it will be understood that, if desired, the clips may first be secured in place on the wall and then the mold member 10 can be snapped into place.

It will be observed that the clips 12, 22 and 32 may be formed from a single size of rectangularly shaped sheet metal. The head and connecting portions of each of the clips are identical in relative positioning, the only difference being in the relative positions of the leg portions with respect to the connecting portions. As will be apparent from the drawings, the lengthe of the connecting portions and of the leg portions will vary, depending upon whether the clip is to be employed on a flat wall surface or at the outside or inside corner thereof. The various shapes of clips are formed from suitable blanks by simple bending operations, as will be readily apparent.

The various forms of clips shown in the drawings are intended for use in connection with panels or wallboards having a thickness of ⅛". Preferably the clips are approximately 4" long and are formed of relatively thin sheet steel or other suitable metal, such as corrosion resisting metal having such characteristics that, while it may be readily formed into the desired shapes, it will securely hold the mold member 10 in position.

It will be understood that these dimensions are set forth for illustrative purposes only. For some applications it is desirable to cut the 4" clips in two, making two clips each 2" long.

The metal molding, such as the mold member 10, is a standard article of manufacture and can be produced at relatively low cost on a quantity production basis. This single standard and comparatively inexpensive shape can be employed at various wall locations by means of the clips 12, 22 and 32 which, since they have the same general configuration, are also comparatively inexpensive to manufacture. Moreover, the molding can be formed of corrosion resisting material to resist the corrosive effects of the atmosphere, such as exist in salt laden air along the seacoast, while the clips for supporting the same can be formed of baser metal, such as sheet steel, since they are not directly exposed.

Since the metal molding is of a single standard shape, it is unnecessary to carry a large stock in order to meet the various wall shapes encountered on the ordinary construction. Standard lengths of molding can be carried, together with an assortment of clips, which will serve all ordinary uses likely to be encountered.

While the invention has been described in connection with mounting metal molding along the juxtaposed edges of panels or wallboards, it will be understood that its use is not so limited. For example, it may be employed to provide an edging for linoleum positioned either on a floor or on a wall. Also, it may be employed to provide an edging for table and desk tops having coverings such as blotters or the like positioned thereon.

While the mold member 10 has been illustrated and described herein as being so shaped and of such resiliency as to be capable of being snapped into place, it will be understood that it may be so constructed as to be slid into place relative to any of the support clips 12, 22 and 32. In such case the clips would preferably be slid into the mold member and then the assembly secured in position, although, as indicated hereinbefore, the clips can be secured in place on the wall and the mold member slid onto them.

The inner contour of the mold member may or may not conform closely to the contour of the head portions of the clips. Thus the mold member might be angular, rather than curved, as shown in Figure 1. Likewise, the head portions of the clips may have other shapes than the arcuate shape shown in the drawings. The principal requirement is that, regardless of the shapes used, the edges of the mold member must interfit with the edges of the head portions of the clips to securely hold the former onto the latter, whether it be snapped on or slid on.

It will be understood that the mold member 10 can be formed of plastic or resinous material instead of metal. In some applications this type of mold member may be preferred to one of metal for decorative or other purposes.

When a joint occurs between lengths of the mold members, preferably one of the clips 12, 22 or 32 will be positioned thereat. This arrangement, with a portion of the clip under each end of the abutting mold members, makes a rigid joint and holds the mold members securely in place.

Since certain further changes may be made in the above constructions and different embodiments of the invention may be made without departing from the scope thereof, it is intended that all matter contained in the foregoing description or shown in the accompanying drawings shall be interpreted as illustrative, and not in a limiting sense.

What is claimed as new is:

1. As an article of manufacture, a one piece metal clip for positioning between the abutting edges of a pair of wallboards to receive a mold strip, said clip having an elongated head portion extending above said wallboards with the outermost surface convex for receiving thereon the mold strip, a flat leg portion for mounting on the surface of the wall underneath said wallboards, and a connecting portion intermediate said head and leg portions, said leg portion extending from said connecting portion at an angle of about ninety degrees to provide for mounting the clip on said wall with said leg portion extending under either of said wallboards while maintaining substantially the same effective position of said head portion.

2. As an article of manufacture, a one piece metal clip for positioning between the abutting edges of a pair of wallboards to receive a mold strip, said clip having an elongated head portion extending above said wallboards with the outermost surface convex for receiving thereon the mold strip, a flat leg portion for mounting on the surface of the wall underneath said wallboards, and a connecting portion intermediate said head and leg portions, said leg portion extending from said connecting portion at an angle of about one hundred and thirty-five degrees to provide for mounting the clip with said leg portion extending under either of said wallboards when positioned along an outside corner of said wall while maintaining substantially the same effective position of said head portion.

3. As an article of manufacture, a one piece metal clip for positioning between the abutting edges of a pair of wallboards to receive a mold strip, said clip having an elongated head portion extending above said wallboards with the outermost surface convex for receiving thereon the mold strip, a flat leg portion for mounting on the surface of the wall underneath said wallboards, and a connecting portion intermediate said head and leg portions, said leg portion extending from said connecting portion at an angle of about forty-five degrees to provide for mounting the clip with said leg portion extending under either of said wallboards when positioned along an inside corner of said wall while maintaining substantially the same effective position of said head portion.

4. As an article of manufacture, a one piece metal clip for receiving a snap on mold strip, said clip having an elongated head portion with the outer surface being convex onto which the mold strip can be snapped and the inner surface being concave, a flat leg portion for mounting on a flat surface, and an intermediate portion forming a continuation of said leg portion and of said convex head portion, the part of said intermediate portion joined to said leg portion being positioned substantially normal to and centrally of the chord joining the edges of said concave inner surface and the remaining part of said intermediate portion conforming to the inner curvature of said concave inner surface.

5. As an article of manufacture, a one piece metal clip for receiving a snap on mold strip, said clip having an elongated head portion with the outer surface being convex onto which the mold strip can be snapped and the inner surface being concave, a flat leg portion for mounting on a flat surface, and an intermediate portion forming a continuation of said leg portion and of said convex head portion, the part of said intermediate portion joined to said leg portion being positioned substantially normal to and centrally of the chord joining the edges of said concave inner surface and the remaining part of said intermediate portion conforming to the inner curvature of said concave inner surface, said leg portion being inclined relative to said intermediate portion on the side thereof away from said part of said intermediate portion conforming to the inner curvature of said concave inner surface.

6. In combination, a plurality of support clips having elongated head portions the outermost surfaces of which are convex for positioning in spaced apart relation along the juxtaposed edges of a pair of wallboards with said head portions thereabove, and a mold member carried by said head portions of said clips on the outside thereof.

7. In combination, a plurality of one piece metal clips for positioning in spaced apart relation along the juxtaposed edges of a pair of angularly related wallboards; each clip having an arcuate head portion onto which a mold member can be secured, a single leg portion for mounting on support means and a connecting portion intermediate said head and leg portions disposed substantially normal to and centrally of said head portion, said leg portion being angularly disposed relative to said connecting portion in such manner as to permit reverse positioning of the clips along the corner formed by said wallboards without altering the effective position of said head portion and with leg portions under both wallboards and the edges thereof fitting underneath the adjacent edges of said head portions; and a mold member carried by the arcuate head portions of said clips.

8. As an article of manufacture, a one piece metal clip for mounting a mold strip, said clip having an elongated head portion with the outer surface being convex for receiving the mold strip and the inner surface being concave, a flat leg portion for mounting on a flat surface, and an intermediate portion forming a continuation of said leg portion and of said head portion by being doubled back on the concave surface of the latter, the part of said intermediate portion joined to said leg portion being positioned substantially normal to and centrally of the chord joining the edges of said concave inner surface.

9. In combination, a plurality of one piece metal clips for positioning in spaced relation along the juxtaposed edges of a pair of wall boards; each clip having an elongated head portion extending a substantial distance over said edges with the outer surface being convex and the inner surface being concave, a flat leg portion for mounting on a flat surface, and an intermediate portion forming a continuation of said leg portion and of said head portion by being doubled back on the concave surface of the latter, the part of said intermediate portion joined to said leg portion being positioned substantially centrally of said head portion; and a mold member carried by and interconnecting the head portions of said clips whereby said edges and the space therebetween are completely concealed.

AARON A. LADON.
FRANK V. OSBORN.